April 1, 1941.  G. E. WESTON  2,237,127
GEAR CHANGING MECHANISM
Filed Oct. 31, 1938  3 Sheets-Sheet 1

Inventor:
George Edward Weston
By [signature]
Attys

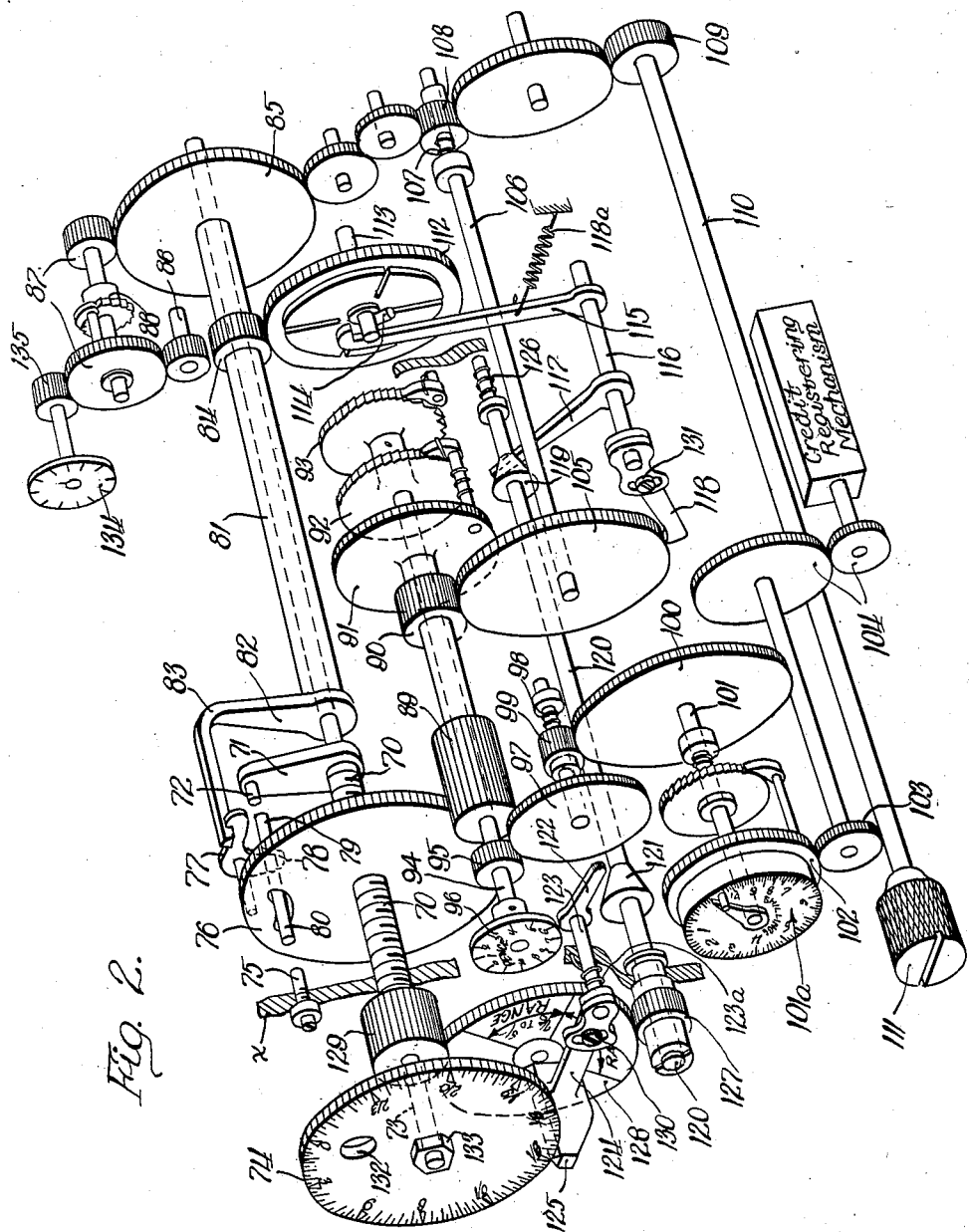

Inventor:
George Edward Weston
By Brown Jackson Boettcher Dienner
Attys

Patented Apr. 1, 1941

2,237,127

UNITED STATES PATENT OFFICE 2,237,127

GEAR CHANGING MECHANISM

George Edward Weston, Enfield, England, assignor to Sangamo Electric Company, Springfield, Ill.

Application October 31, 1938, Serial No. 238,120
In Great Britain November 11, 1937

10 Claims. (Cl. 74—112)

The present invention relates to gear changing devices and is more particularly concerned with mechanisms in which the gear ratio between the driving and driven elements is variable in a large number of small steps. Although not exclusively concerned therewith, the present invention is particularly applicable to price changing mechanisms for use in connection with fixed charge collecting devices such as are employed in certain forms of electricity and like prepayment mechanisms.

The principal object of the present invention is to provide an improved and simplified gear changing device in which a much larger number of variations of gear ratio can be made in a more efficient manner than has heretofore been possible. For instance, the present invention permits the construction in a relatively simple manner of a fixed charge collector which is capable of variation over a range of from zero to ten shillings in farthing steps.

A further object of the invention is to enable such wide range adjustments to be effected in a simple manner by a single manipulation.

According to the principal feature of the invention the ratio between the driving and driven shafts or like elements of the device is controlled by variation of the extent of travel of a member movable along a helical or spiral path between two limiting stops which positively determine the limits of such travel in either direction. The use of a helical or spiral path for the controlling member allows the maximum length of path of such member to be extended, if necessary, to more than one complete revolution for instance to four or even more revolutions thereby permitting increased accuracy of the subdivision of such total path length into separate steps each corresponding to the smallest unit required. The variation of the length of the path is preferably effected by making one of the limiting stops in the form of an abutment member itself adjustable along a similar shaped path and according to another feature of the invention this abutment member is moved to any required adjustment position by means of a manually operable setting indicator to which it is directly connected without any interposed gear trains, linkages or other means. The direct connection between the indicator and the abutment member eliminates any inaccuracy of setting due to blacklash, whip or the like in the interconnecting means.

According to one embodiment of the invention the amount of movement imparted to the driven element of the device by a constantly operating driving power source during a predetermined operative cycle of the latter is governed by the extent of movement of the controlling member in one direction along a helical or spiral path having a maximum possible length involving more than one revolution of the member while the return movement of the said member back along the said path is arranged to take place during a part of the operative cycle which is both smaller than and separate from that during which the governing movement of said member can take place. By this arrangement of two separate distinct periods one for forward and the other for return movement of the member, any possibility of premature commencement of another operative or governing movement during the original operative cycle is avoided. Such premature commencement is sometimes possible when only small extents of movement of the controlling member are being employed whereby the majority of the possible operative part of the cycle is not usefully employed.

In another embodiment of the invention the rotational movement of a predetermined amount is arranged to be transmitted by a driving power source to a member movable in a helical or spiral path about a shaft itself rotatably mounted and connected through gearing to the device to be driven, adjustable stop means being provided on said shaft for limiting the extent of helical or spiral movement of said member whereby rotational movement of the latter by the driving power source in excess of that necessary to effect the said helical or spiral movement causes rotation of the shaft and operation of the driven device.

In order that the invention may be more readily understood two constructional embodiments thereof will now be described by way of example with reference to the accompanying drawings, in which:

Figure 2 is a schematic perspective view similar to Figure 1 of another embodiment;

Figure 4:
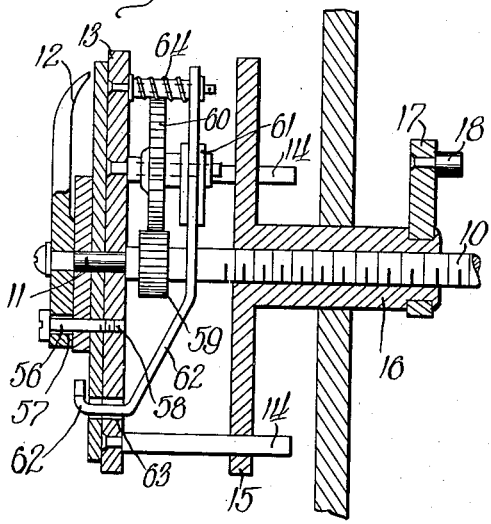
Figure 3:
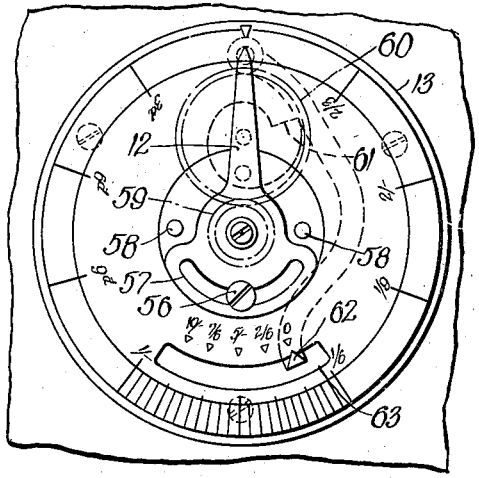
Figure 6:
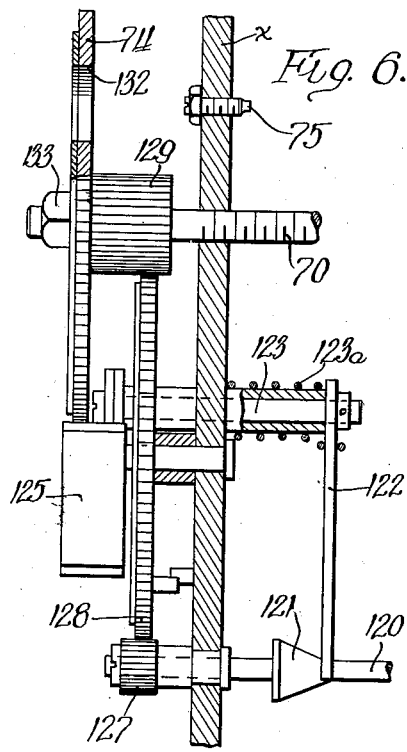
Figure 5:
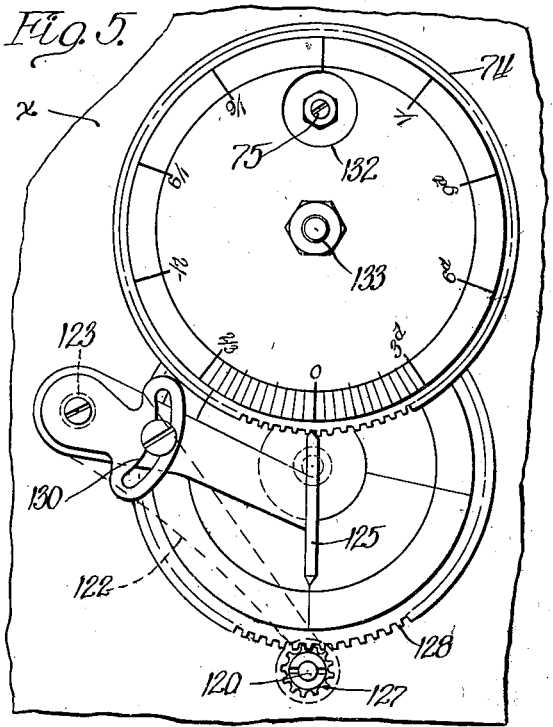

Figures 3 and 4 are front elevational and vertical sectional views respectively of one form of setting dial; while Figures 5 and 6 are elevational and sectional views respectively similar to Figures 3 and 4 of another form of setting dial construction.

In each of the schematic views (Figures 1 and 2) various members such as the fixed frame plates supporting the various parts have been omitted for the sake of clarity. Furthermore the views are purely diagrammatic and it is to be understood that the disposition of the various members and the gear ratios of the various wheel trains are arranged as desired and according to circumstances.

Figure 1:
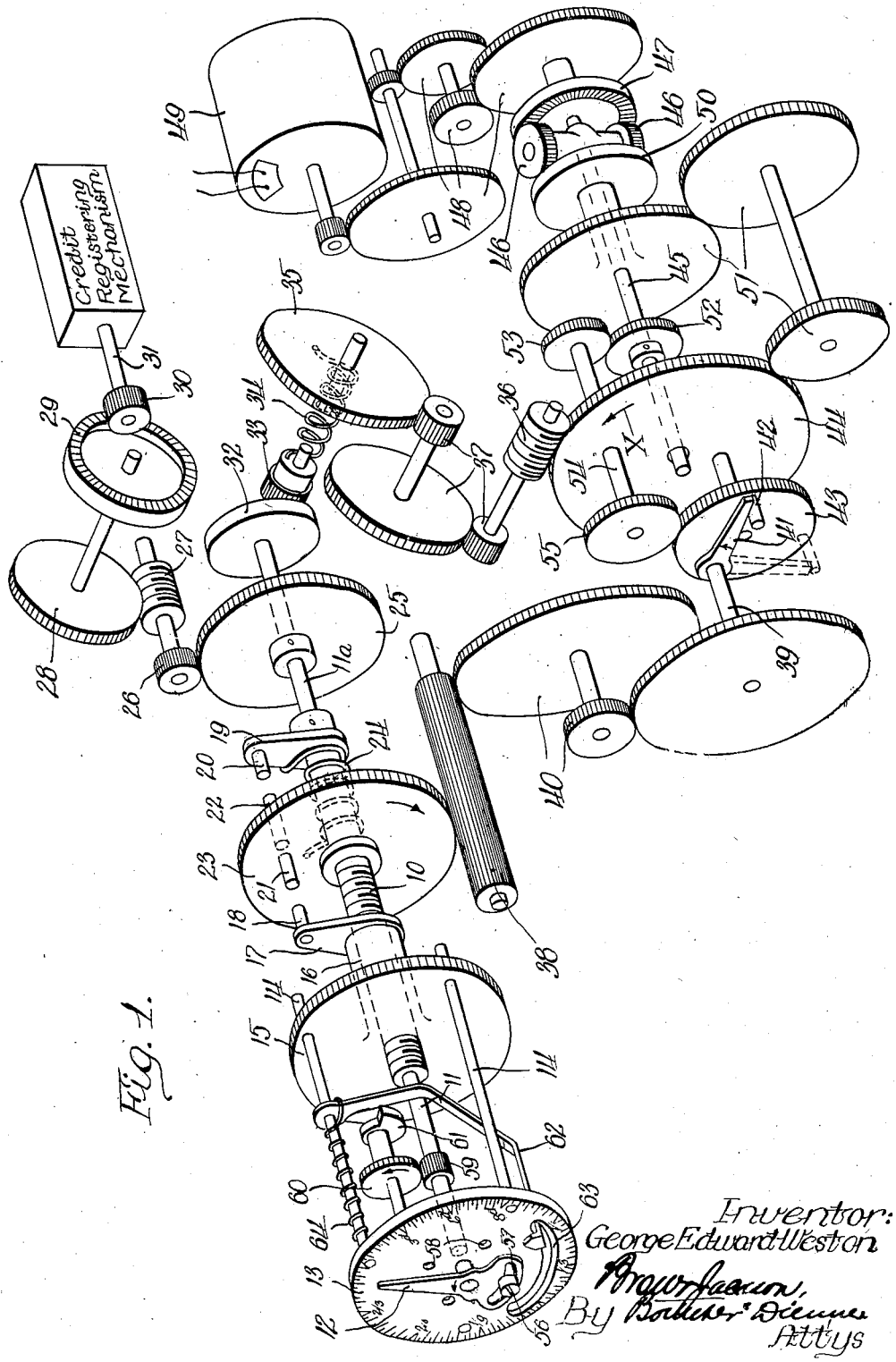
Figure 1 is a schematic perspective view of one embodiment of the invention.

Referring first to the embodiment shown in Figure 1 a screw-threaded shaft 10 is provided with extensions 11, 11a. A pointer 12 secured to the end of the extension 11 cooperates with a scale disc 13 loosely mounted on the extension. This scale disc forms part of the setting device illustrated more clearly in Figures 3 and 4 and described in detail later. The disc 13 is provided with rearwardly extending pins 14 which slidably engage with holes in a disc 15 integral with a sleeve 16 which is screw-threaded internally for engagement with the threaded shaft 10. The rear end of the sleeve 16 is provided with a radially extending lug 17 carrying an abutment in the form of a pin 18 projecting parallel with the shaft 10. At the rear end of the threaded shaft 10 is secured a similar lug 19 carrying a second abutment in the form of a pin 20 also projecting parallel with the shaft 10. The pins 18, 20 project towards one another and are arranged to engage respectively with abutment pins 21, 22 on opposite sides of a gear member 23 the hub of which is screw-threaded for engagement with the shaft 10. A helical spring 24 connected between the lug 19 and the gear member 23 normally urges the latter forwardly along a helical path determined by the screw-thread of the shaft 10 to bring the pin 21 into engagement with the pin 18. The shaft 10 together with the setting device and other parts carried thereby is rotatably mounted in the fixed frame plates (not shown).

The extension 11a of the shaft 10 carries a spur gear 25 engaging a pinion 26 secured to a shaft rotatably mounted in the fixed frame and carrying a worm 27 which latter engages a worm wheel 28 secured to another shaft also rotatably mounted in the fixed frame and provided with a crown wheel 29 driving a pinion 30 rigid with a shaft 31 which forms the driven shaft of the device and which is connected in suitable manner to the further mechanism to be operated, for instance to the credit registering means of a prepayment mechanism such as disclosed in British Patent No. 415,721, August 24, 1934. It will be understood that the credit registering mechanism is provided to indicate in units of money the amount that is available for further purchase of the commodity, i. e., electricity, that is being vended. According to the present invention mechanism is provided for applying a fixed or base charge for the availability of the service whether or not it is used. This charge is deducted from the credit registered by the credit registering mechanism in the same manner that charges for the use of the electricity are deducted. The extension 11a also has secured thereto a further crown wheel 32 engaging a pinion 33 which is rotatably mounted in a fixed frame part and is coupled to one end of a helical or spiral spring 34 anchored at its other end to a gear wheel 35 which drives a worm 36 through a suitable gear train 37.

The gear member 23 is always in driving connection with a long pinion 38 irrespective of the position of the said gear member on the screw-threaded shaft 10. The pinion 38 which is rotatably mounted in the fixed frame structure is in driving connection with a shaft 39 also rotatably mounted in the fixed frame through a gear train 40. The shaft 39 carries a radial arm 41 which is adapted to engage with a pin 42 eccentrically mounted upon a gear wheel 43. The gear wheel 43 is pivotally mounted upon a disc 44 provided with a toothed periphery engaged by the worm 36. The disc 44 is itself loosely mounted on a shaft 45 carried by the fixed frame and connected to the planet wheels 46 of a differential gear unit, one sun wheel 47 of which is connected by way of a suitable reduction gear train 48 to a suitable constantly rotating driving power source such as a synchronous electric motor 49 while the other sun wheel 50 is in driving engagement with the toothed periphery of the disc 44 by way of a gear train 51 which has a ratio such that two revolutions of the sun wheel 50 are necessary to effect one revolution of the disc 44. The shaft 45 also has a pinion 52 secured thereto in driving engagement with a pinion 53 secured to a shaft 54 which is pivotally mounted in the disc 44 and is secured to a further pinion 55 in driving engagement with the gear wheel 43. The gear ratio between the shaft 45 and the gear wheel 43 is 1:1.

The disc 44 with its associated gear wheels constitutes a form of epicyclic gearing the manner of operation of which will be more fully described hereinafter. The shaft 39 is mounted in axial alignment with the shaft 45 while the pivotal mounting of the gear wheel 43 is eccentric with respect to the two shafts 39, 45. The length of the arm 41 is such that in the position shown in chain dotted lines (Figure 1) the pin 42 passes out of engagement with the arm 41.

The operation of the device is as follows. Each operative cycle of the device involves the helical movement of the gear member 23 from the abutment pin 18 to the second abutment pin 20 and later back again to the pin 18. This cycle may be arranged to take place in any desired time interval for instance 1 hour, 1 day or 1 week and is governed by the gear train 48 connecting the constantly rotating power source 49 with the differential gear unit 46, 47, 50.

The gear member 23 is normally positioned at the commencement of an operative cycle of the device, with the pin 21 in engagement with the pin 18. Operation of the driving power source 49 causes rotation of the sun wheel 47 through the gear train 48. As the disc 44 is locked against movement by the worm 36 the sun wheel 50 is likewise locked through the gear train 51. In consequence rotation of the sun wheel 47 causes rotary movement of the planet wheels 46, shaft 45, gear wheels 52, 53 and 55 to cause rotary movement of the gear wheel 43. Rotation of gear wheel 43 brings the pin 42 into driving engagement with the arm 41 and consequently effects rotation of shaft 39, gear train 40, long pinion 38 and the gear member 23 in the direction of full line arrows (Figure 1). This rotation of the gear member 23 is in a direction which causes it to move along the screw-thread of the shaft 10 which is held stationary by the resistance of its geared connection with the shaft 31 towards the pin 20 thereby winding up the spring 24.

After a certain length of helical travel governed by the distance between the pins 18 and 20 the helical movement of the gear member 23 will be arrested by engagement of pin 22 with pin 20. Thereafter continued rotation of gear member 23 by pinion 38 will cause rotary movement to be imparted to the shaft 10 and the parts carried thereby. This rotary movement which is the effective movement of the device is transmitted by way of gears 25, 26, worm 27, worm wheel 28 and gears 29, 30 to the driven shaft 31. At the same time the crown wheel 32 drives pinion 33 and causes the stressing of the spring 34. The gear wheel 35 connected to the other end of the storage spring 34 cannot be operated owing to the reaction imparted to the worm 36 by the disc 44 by reason of the movement being transmitted through gears 53, 55, and 43.

At a point near the end of a complete operative cycle the pin 42 passes from engagement with the arm 41 and thereby frees the shaft 39. The spring 24 then becomes operative to effect a return movement of the gear member 23 along a helical path until the pin 21 thereon engages the pin 18. This return movement also returns the arm 41 towards its original position but as this movement is limited by the length of travel of the gear 23 the arm will be arrested at a position short of that at which it was engaged by the pin 42 at the commencement of the cycle. At the same time the spring 34 operates the worm 36 to cause movement of the disc 44 in a forward direction, i. e., that indicated by the arrow X. The gear ratio between the crown wheel 32 and the worm 36 is such that this movement of the disc 44 brings the axis of the gear 43 into the same position relative to the arm 41 as it was at the beginning of the cycle. The rotation of the disc 44 is simultaneously transmitted by way of the gear train 51 to the sun wheel 50 to cause a rotary movement of the gear wheel 43 through the differential planet wheels 46 and gears 52, 53 and 55. This latter movement of the gear 43 brings the pin 42 thereon into correct position to engage the arm 41 upon commencement of a fresh operative cycle. It will thus be seen that the parts 41, 42 and 43 are brought to occupy the same relative positions at the beginning of each cycle although the axis of the gear 43 will gradually travel round the axis of the disc 44 by amounts which depend upon the proportion of the total movement of the arm 41 which is transmitted through to the shaft 31 and gear 32.

It will be appreciated that the amount of movement imparted to the driven shaft 31 by the driving power source 49 during each operative cycle is governed by the period during each cycle in which the pin 22 engages the pin 20 and so causes rotation of the shaft 10 itself. The length of this period is in turn governed by the amount of idle movement of the gear member 23 between the pin 18 and the pin 20. If this idle movement takes the whole of the period during which the pin 42 is in engagement with the arm 41 then clearly no drive will be transmitted to the shaft 31. Similarly if the pins 18, 20 are so disposed that their co-operating pins 21, 22 are always in engagement with each other then the whole of the operative movement imparted to the arm 41 by the pin 42 will be effective on the driven shaft 31.

The setting of the amount of movement to be imparted to the shaft 31 per operative cycle is effected by adjustment of the position of the pin 18 with respect to the pin 20 by moving the former pin along the screw-thread of the shaft 10. For this purpose a setting dial constituted by the pointer 12 and the scale disc 13 is provided. The particular construction of this device is illustrated more clearly in Figures 3 and 4. From these figures it will be seen that the pointer 12 rigidly secured to the extension 11 of the shaft 10 is provided with a clamping screw 56 engaging the scale disc 13 through an arcuate slot 57 in the pointer. A number of tapped holes 58 provided in the scale disc 13 permit the adjustment and clamping of the pointer 12 to any position of the scale. Rotation of the pointer 12 relative to the scale 13 will cause relative movement between the disc 15 and the screwed shaft 10 and consequently will cause an alteration in the distance to be traversed by the gear member 23 between the pins 18 and 20.

It is a feature of this invention that the maximum range of movement of the gear member 23 involves more than one revolution, for example four or even more complete revolutions, thereby enabling accurate subdivision of the total range. It is, therefore, necessary to be able to rotate the pointer 12, which is directly connected to the adjustable pin 18, over a similar number of revolutions relative to the scale 13 in order to effect adjustment of the pin 18 to any point over the maximum range. This in turn calls for supplementary indicating means for showing which of the complete revolutions of the pointer is actually being indicated by the pointer 12 on the scale 13. This additional means in the embodiment shown comprises a gear wheel 59 secured to the extension 11 and in driving engagement with a gear 60 pivotally mounted on the rear of the scale 13. The gear 60 is connected to a cam 61 operative upon a pointer arm 62 pivotally mounted at one end on the scale 13 and projecting at its other end through an arcuate slot 63 in the scale 13. The latter end of the pointer arm 62 is provided with suitable indicating means co-operating with markings on the scale disc 13. The pointer arm 62 is urged into engagement with the cam 61 by a suitable spring 64.

In the zero position the pointer 12 is opposite the zero marking around the periphery of the scale 13 and the pointer 62 opposite the zero marking of its associated scale while the pin 18 is located as far forwardly as is possible. The helical path of the gear 23 between the pins 18 and 20 will then be so long that the movement of the gear will occupy the whole of the period of movement of the arm 41 by the pin 42 and no movement will be transmitted to the shaft 31. Rotation of the pointer 12 relative to the scale 13 to increase the setting reading will cause helical movement of the lug 17 and pin 18 towards the pin 20 until at the end of one complete revolution the pointer 12 will have returned to the zero indication. The gear 59, however, has in the meantime operated upon the gear 60 to move the cam 61 relative to the pointer arm 62 whereby the latter has been moved from the zero to the first indication on its scale, in the example shown in Figure 3 to the indication marked 2/6d. Further rotation of the pointer 12 relative to the scale 13 during the second revolution will cause further forward helical movement of the lug 17 and arm 18. The indications now effective are of course the total of the indication of the pointer 12 upon the scale disc 13 and the pointer 62 on its associated scale. In like manner continued rotation of the pointer 12 will cause corresponding movement of the pointer 62 towards its maximum indication.

In the second embodiment of the invention illustrated more particularly in Figures 2, 5, and 6, movement of a member over a helical path is again used for controlling the amount of movement transmitted by the driving power source to the driven member. In this embodiment, however, the amount of helical movement is an exact measure of the amount of movement transmitted from the driving source to the driven member since movement is transmitted only during helical movement of the moving member in one direction. In this embodiment a normally stationary screw-threaded shaft 70 is provided at its rear end with a radially projecting lug 71 secured thereto and carrying an abutment pin 72 projecting parallel to the shaft 70. The forward end of the shaft 70 is carried in a tapped hole in a fixed frame plate x of the device and is provided with a forward extension 73 carrying a scale plate 74. A further abutment pin 75 is mounted in the fixed frame plate x and projects towards the pin 72. A gear member 76 provided with an internally threaded hub is carried upon the screw-thread of the shaft 70 and is arranged to travel backwards and forwards along a helical path on the screw-thread between the pins 72 and 75. A pawl 77 pivotally mounted near the periphery of the gear member 76 is provided with an inwardly projecting arm 78 carrying oppositely directed pins 79 and 80. The pin 80 projects through a slot in the gear member 76 towards the pin 75 and is arranged to engage the latter when the gear member is moved as far forwardly as possible while the pin 79 is likewise arranged to engage the pin 72 when the gear member is moved as far rearwardly as possible. The pawl 77 is frictionally mounted so that it is held in whichever position it is placed by engagement with one or other of the pins 72, 75. Concentric with the shaft 70 is a rotatably mounted sleeve 81 having a radial arm 82 fixed thereto and provided with an extension 83 disposed parallel to the axis of the shaft 70. The extension 83 is adapted in one position of the pawl 77 to engage and drive the latter and is of such a length that it can do this in any position of the gear member 76 along the axis of the shaft 70. The sleeve 81 is connected to a pinion 84 and a gear 85 which latter is in driving connection with a shaft 86 through a gear train 87 which includes a ratchet device or friction clutch 88. The shaft 86 is rotatably mounted in the fixed frame and is connected through suitable gearing to a constantly rotating power source such as a synchronous electric motor. A time indicating dial 134 may be provided driven by way of a pinion 135 from the gearing associated with the drive to the power source when the latter is a synchronous electric motor.

The toothed periphery of the gear member 76 is engaged by a pinion 89 which has such a length that it always remains in mesh with the gear member 76 irrespective of the position of the latter along the shaft 70. The pinion 89 is integral with a rotatably mounted sleeve carrying a pinion 90 and a disc 91. The disc 91 carries a pawl near its periphery held in engagement with a ratchet wheel 92 rigidly secured to a second ratchet wheel 93 and a shaft 94 carried coaxially with the pinion 89 in the fixed frame of the device. The second ratchet wheel 93 cooperates with a pawl secured to a fixed part of the device.

The shaft 94 is connected to a further pinion 95 and a test dial 96 located at the front of the device. The pinion 95 drives a gear 97 which is connected through a friction clutch 98 to a pinion 99 meshing with a gear wheel 100 secured to the centre shaft 101 of a spring drum device 101a. The toothed periphery 102 of the spring drum is connected by way of gear 103 to a gear train 104 leading to the device to be driven, such as the credit registering means of prepayment mechanism which, as previously set forth, may be of the type shown in British Patent No. 415,721, August 24, 1934. The shaft 101 may, therefore, be regarded as being the driven shaft of the gear changing device.

The pinion 90 is in mesh with a gear 105 connected by way of shaft 106 and friction clutch 107 to a pinion 108 which is in driving engagement with the gear 85 and also with a further gear 109 connected to a staff 110 rotatably mounted in the frame plates and provided at its forward end with a manual operating knob 111. Pinion 108 is mounted on but not secured to the shaft 106, being in frictional driving connection therewith through the clutch device 107.

The pinion 84 meshes with a gear wheel 112 connected to a rotatably mounted shaft 113 carrying a projecting lug 114. The connection between the gear wheel 112 and the shaft 113 is preferably adjustable for instance by the use of a frictional holding device. The lug 114 is adapted, during rotation of the shaft 113, to engage the nose of a lever 115 secured to a rock shaft 116 which also carries an arm 117 and a pawl device 118 normally held in engagement with the periphery of the gear 105 or to a ratchet wheel fixed to the shaft 106 by a spring 118a.

The arm 117 is arranged in close relationship with a frusto-conical member 119 secured to a staff 120 which projects forwardly towards the front of the device. The staff 120 which is both rotatably and slidably mounted in the frame plates is provided with a further frusto-conical member 121 which co-operates with a further lever 122 secured to a spindle 123 pivotally mounted in a fixed frame part of the device and connected at its forward end to a radially projecting arm 124 provided at its free end with a tooth-shaped detent 125 normally urged into a position to locate and lock the scale 74 in any adjustment position by means of a spring 123a. The staff 120 is normally urged forwardly by a spring 126 and projects through the centre of a hollow gear member 127 which is mounted for rotation only in a fixed part, e. g., the front frame plate of the device. The gear 127 is provided with a forwardly projecting sleeve having tool engaging means such as a screw-driver slot therein. Both the end of the staff 120 and the sleeve on the gear 127 are formed of insulating material for avoiding electrical connection of the tool with the mechanism. The arrangement of the parts 127 and 120 is such that the engagement of the tool for effecting alteration of the setting necessarily causes axial movement of the staff 120 and the frusto-conical members 119, 121 in a rearward direction against the action of the spring 126 and the springs 118a and 123a of the parts associated with the frusto-conical members 119 and 121. The resultant effect of this rearward movement will be referred to later.

The gear 127 engages the periphery of a toothed disc 128 pivotally mounted on the front of the device and itself in engagement with a gear 129 secured to the extension 73 of the shaft 70. The toothed disc 128 is provided with a number of markings of sector form each corresponding to one revolution of the scale 74 and is arranged to make less than one complete revolution for the total number of revolutions of the shaft 70 constituting the maximum range of adjustment of the device. The detent 125 is preferably so arranged that it forms a dual indicator device co-operating with the scale 74 and also with the markings on the disc 128.

In the operation of this embodiment the constantly rotating power source operates upon the shaft 86 which through gear train 87, ratchet device or friction clutch 88 and gear 85 causes continuous rotation of the sleeve 81 and the associated pinion 84 and arm 82, 83. The time dial 134 is also rotated to give any desired form of time-check.

At the commencement of an operative cycle of the device the pin 80 will be in engagement with the pin 75 so that the pawl 77 is lifted into the path of the arm extension 83. During its rotation this extension, which is provided with a chambered leading edge which co-operates with a suitable shaped tooth of the pawl 77, will pick up and drive this pawl together with the gear wheel 76 so that the latter member moves along the thread of the shaft 70 in a helical path from the point where the pin 80 engaged the pin 75 to the point where the pin 79 engages the pin 72. When the pin 79 engages the pin 72 on the lug 71 the pawl 77 will be rocked in a direction to lower its free end or nose out of the path of the extension 83 and in consequence the gear 76 will then be disconnected from the extension 83 which will continue to rotate idly for the remainder of the operative cycle. The top edge of the pawl tooth is slightly rounded so that, when disengaged, the extension 83 in passing over the said top edge will depress the pawl to a position where there is no possibility of accidental re-engagement of the tooth with the extension until the pawl is again properly raised.

The rotation thus effected to the gear member 76 is transmitted to the long pinion 89 and thence to the pinion 90 and the disc 91. The pinion 90 drives the gear 105 and shaft 106 in the direction which is permitted by the pawl device 118 while the disc 91 moves its associated pawl in a direction to drive the ratchet wheel 92 together with the interconnected shaft 94, gears 95, 97, friction clutch 98 and gears 99 and 100 to the driven shaft 101 connected to the centre of the spring drum 101a. This spring drum merely acts as a motion storage device in the event of the further member to which the gears 103, 104 are connected being temporarily immovable, while the friction clutch 98 acts as a safety device to prevent damage in the event of the spring drum 101a becoming fully wound. Normally the operative movement thus imparted to the spring drum is transmitted directly to the further or driven device for instance the credit registering means of a prepayment mechanism. The other ratchet wheel 93 and associated pawl act to prevent backward or reverse movement of the shaft 94 and interconnected parts.

The constantly rotating shaft 86 is continuously turning the gear 108 by way of the gear train 87, clutch 88 and gear wheel 85 in the opposite direction to that of the movement imparted to the associated shaft 106 by the gears 90 and 105, but this movement of the gear 108 cannot normally become effective owing to the engagement of the pawl device 118. In consequence the clutch 107 slips.

The continuously rotating sleeve 81 also drives the shaft 113 by way of the gears 84 and 112 to cause continuous rotation of the lug 114. The gear ratio between the sleeve 81 and the shaft 113 is so arranged that the latter shaft makes one revolution per operative cycle although the sleeve 81 preferably makes a plurality of revolutions per cycle. After the completion of a sufficient number of revolutions of the sleeve 81 to effect movement of the gear member 76 over its maximum range of helical movement the lug 114 engages the arm 115 to cause rocking of the rock shaft 116 and the removal of the pawl device 118 from the teeth of the wheel 105. Upon tripping of the lever 115 and release of the pawl device 118 from the gear 105 the movement of the constantly operating power source is allowed to become effective upon the shaft 106 through the gears 85 and 108 and friction clutch 107. This movement being in the opposite direction to that previously imparted to the shaft by the movement of the gear member 76 now serves to return the said gear member to its forward position where the pin 80 again engages the pin 75 to reset the latter into the path of the arm 83. When this point is reached the friction clutch 107 commences to slip. This return movement of the pinions 89 and 90 and disc 91 is not effective, however, upon the shaft 94 owing to the ratchet and pawl connection 92 and the further locking ratchet wheel 93. In consequence the driven device is not returned. After a movement of the gear 108 sufficient to return the gear member 76 over its maximum travel the lug 114 disengages from the arm 115 and causes re-engagement of the pawl device 118 with the gear 105. This point marks the end of a complete operative cycle and the extension 83 is now in a position to re-engage the pawl 77 and commence a new cycle.

It will thus be seen that the constantly rotating power source is always attempting to return the gear member 76 towards its forward position by way of the friction clutch 107 but is normally not permitted to do so by the pawl 118. Periodically the power source positively drives the gear member 76 in a rearward direction to cause corresponding movement of the driven device and after such movement, which may be varied in extent at will, has been effected, the power source operates idly until the particular point in the cycle where the return movement by way of the friction clutch 107 is permitted. The return movement thus occupies an entirely separate part of the operative cycle so that any difficulty due to premature recoupling of the pawl 77 with the extension 83 if a low value setting is employed is avoided. The ratio between the parts of the operative cycle available for forward or operative movement and return movement is preferably arranged so that the operative portion is much greater than the return portion, for example in a ratio of say 4:1, i. e., four-fifths of a cycle for operation and one-fifth for return. In any case the return movement is effected during less than one revolution of the extension arm 83.

In order that the device may be quickly tested by manual operation instead of by the power source the sleeve 81 may be rotated from the manual knob 111 by way of the gears 109, 108 and 85. The ratchet device or friction clutch 88 in the main drive operates under these conditions to avoid having to rotate the power source and the inter-connecting gear train. The test dial 96 is suitably calibrated so that by operating the device manually over a complete cycle a direct check reading of the actual movement of the driven shaft can be obtained. This can be compared with the setting indication given by the scales 74 and 128.

In the application of the device to a fixed charge collector the spring drum device 101a constitutes a means for dealing with any arrears charge to be made, the movement of the pointer or the shaft 101 over the scale on the drum itself giving a visible indication of the amount of the arrears charge. As the test dial, which is calibrated in the smallest units, is geared to the drum it may be employed as a vernier device for computing the arrears charge during testing with greater accuracy than is possible by direct reading of the markings on the drum 101a.

The adjustment of the device is effected by rotating the scale disc 74 to the appropriate setting as indicated by the detent 125 and as this setting requires the rotation of the disc 74 over more than one revolution the subsidiary disc 128 is provided to indicate which particular range section is being dealt with by the scale 74. The setting of the device to any desired adjustment is effected by rotation of the gear 127 by means of a suitable tool such as a screw-driver. The insertion of this tool in the slots of the head on the gear 127 causes axial movement of the staff 120 which in turn causes rocking of the detent 125 from the periphery of the scale 74 and the removal of the pawl device 118 from the gear 105. These operations allow the adjustment to be effected in either direction without damage to the mechanism. In order to allow the accurate initial assembly of the parts 125 and 118 they are preferably provided with adjusting means such as the slot and set screw construction shown at 130 and 131 respectively. In order to allow the accurate adjustment of the fixed abutment pin 75 it is preferably arranged to be screwed into the frame plate X and adjustable from the front of the device for instance through an aperture 132 in the scale 74. The precise setting of the latter scale upon the shaft extension 73 may be obtained by means of a screwed connection between the parts and a lock nut 133.

In each of the embodiments described the smallness and accuracy of subdivision does not depend upon the use of ratchet means but upon the variable length of a movement. The ratchet wheels where employed are used merely as means for preventing reverse rotation and may be substituted by other suitable means such as ball clutches or worm gearing. While the movement of the controlling member has been described as being over a helical path it will be clear that a spiral path could be employed instead and this alternative is intended to be included within the present invention.

It will be understood that any desired number of revolutions of the helically moving member may be assigned to the maximum range of the device for instance 10 revolutions, each revolution covering a range of say 1/- per week in the case of a fixed charge collector. Similarly the two dials of the setting mechanism can be arranged to indicate pence on one and shillings on the other, or cents and dollars.

I claim:

1. A gear changing device more particularly for use as a fixed charge collector in electricity and like prepayment mechanisms which comprises an externally threaded member, an internally threaded gear wheel mounted on said externally threaded member for helical movement therealong, an axially projecting abutment carried on each side of said gear wheel, two further abutments located one on either side of said gear wheel in fixed relation to the externally threaded member for co-operation respectively with the gear wheel abutments positively to limit said helical movement, means for rotating said gear wheel from a constantly operating driving power source to move it in one helical direction from engagement with one of said further abutments to engagement with the other of said further abutments and means for subsequently returning said gear wheel to engagement with the first of said further abutments.

2. Mechanism for connecting a driven shaft to a drive shaft during a variable fractional part of an operating cycle comprising, in combination, abutment means through which rotation of said drive shaft is translated to said driven shaft, means mounting said abutment means for movement along a helical or spiral path, the maximum length of which involves a plurality of rotations of said abutment means, two stops for determining the initial and final positions of said abutment means along said path, manually adjustable means for varying the relative positions of said stops to vary the portion of said operating cycle during which said driven shaft is operatively connected to said drive shaft, and means operatively connecting said abutment means to said drive shaft for returning the former to its initial position along said path during a part of said operating cycle which is smaller than the portion thereof during which said abutment means is moved to its final position.

3. Mechanism for connecting a driven shaft to a drive shaft during a variable fractional part of an operating cycle comprising, in combination, abutment means through which rotation of said drive shaft is translated to said driven shaft, means mounting said abutment means for movement along a helical or spiral path, two stops for determining the initial and final positions of said abutment means along said path, means rotatable along a helical or spiral path through a plurality of revolutions mounting one of said stops to permit variation of the portion of said operating cycle during which said driven shaft is operatively connected to said drive shaft, indicator means rotatable together with the rotatable stop for showing the extent the movement thereof in a single rotation, and auxiliary indicator means co-operating with said indicator means for showing the number of revolutions through which said rotatable stop has been rotated.

4. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means for subsequently returning said gear wheel and abutment means to engage the latter with said one stop, and manually adjustable means for varying the relative positions of said stops to vary the portion of said operating cycle during which said driven shaft is operatively connected to said drive shaft.

5. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means interconnecting said other stop and said driven shaft whereby the latter is rotated on further rotation of said gear wheel, means for disconnecting said gear wheel from said driving shaft at the end of each operating cycle, means subsequently returning said gear wheel and abutment means to engage the latter with said one stop during a part of said operating cycle which is smaller than the portion thereof during which said gear wheel is rotated to move said abutment means from said one stop to said other stop, and manually adjustable means for varying the relative positions of said stops to vary the portion of said operating cycle during which said driven shaft is operatively connected to said drive shaft.

6. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means for subsequently returning said gear wheel and abutment means to engage the latter with said one stop, means rotatable along a helical or spiral path through a plurality of revolutions mounting one of said stops to permit variation of the portion of said operating cycle during which said driven shaft is operatively connected to said drive shaft, indicator means rotatable together with the rotatable stop for showing the extent the movement thereof in a single rotation, and auxiliary indicator means cooperating with said indicator means for showing the number of revolutions through which said rotatable stop has been rotated.

7. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means interconnecting said other stop and said driven shaft whereby the latter is rotated on further rotation of said gear wheel, means for disconnecting said gear wheel from said driving shaft at the end of each operating cycle, spring means subsequently returning said gear wheel and abutment means to engage the latter with said one stop during a part of said operating cycle which is smaller than the portion thereof during which said gear wheel is rotated to move said abutment means from said one stop to said other stop, means rotatable along a helical or spiral path through a plurality of revolutions mounting said one stop to permit variation of the portion of said operating cycle during which said abutment means is out of engagement with said stops, a pointer rotatable with said one stop, a scale adjacent to which said pointer rotates for showing the extent of movement of said one stop in a single rotation, and auxiliary indicator means cooperating with said pointer for showing the number of revolutions through which said one stop has been rotated.

8. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means interconnecting said other stop and said driven shaft whereby the latter is rotated on further rotation of said gear wheel, means for disconnecting said gear wheel from said driving shaft at the end of each operating cycle, spring means subsequently returning said gear wheel and abutment means to engage the latter with said one stop during a part of said operating cycle which is smaller than the portion thereof during which said gear wheel is rotated to move said abutment means from said one stop to said other stop, means rotatable along a helical or spiral path through a plurality of revolutions mounting said one stop to permit variation of the portion of said operating cycle during which said abutment means is out of engagement with said stops, a pointer rotatable with said one stop, a scale adjacent to which said pointer rotates for showing the extent of movement of said one stop in a single rotation, an auxiliary pointer, a scale adjacent to which said auxiliary pointer rotates, and cam means geared to said pointer and driving said auxiliary pointer to show the number of revolutions through which said one stop has been rotated.

9. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means interconnecting said gear wheel and said driven shaft whereby the latter is rotated on rotation of the former, means for disconnecting the connection between said gear wheel and said drive shaft by engagement of said abutment means with said other stop, means subsequently returning said gear wheel and abutment means to engage the latter with said one stop during a part of said operating cycle which is smaller than the portion thereof during which said gear wheel is rotated to move said abutment means from said one stop to said other stop, and manually adjustable means for varying the relative positions of said stops to vary the portion of said operating cycle during which said driven shaft is operatively connected to said gear wheel.

10. Mechanism for connecting a driven shaft to a drive shaft during a variable fractional part of an operating cycle comprising, in combination, an externally helically threaded member, an internally helically threaded gear wheel through which rotation of said drive shaft is translated to said driven shaft and which is mounted on said externally threaded member for rotary and translatory movement therealong, axially projecting abutment means carried on each side of said gear wheel, two stops located one on either side of said gear wheel in fixed relation to said externally threaded member for cooperation respectively with said abutment means positively to limit the helical movement in either direction of said abutment means during movement of said gear wheel by directly arresting the rotary movement of said abutment means, means for rotating said gear wheel from said driving shaft to move said abutment means in one helical direction from engagement with one of said stops to engagement with the other of said stops, means interconnecting said gear wheel and said driven shaft whereby the latter is rotated on rotation of the former, means for disconnecting the connection between said gear wheel and said drive shaft by engagement of said abutment means with said other stop, means driven by said drive shaft for subsequently returning said gear wheel and abutment means to engage the latter with said one stop during a part of said operating cycle which is smaller than the portion thereof during which said gear wheel is rotated to move said abutment means from said one stop to said other stop, means rotatable along a helical or spiral path through a plurality of revolutions mounting said other stop to permit variation of the portion of said operating cycle during which said gear wheel is connected to said driven shaft, a scale rotatable with said other stop, an index adjacent to which said scale rotates for showing the extent of movement of said other stop in a single rotation, and auxiliary indicator means cooperating with said scale for showing the number of revolutions through which said other stop has been rotated.

GEORGE EDWARD WESTON.